(12) United States Patent
Ohira et al.

(10) Patent No.: US 7,372,807 B2
(45) Date of Patent: May 13, 2008

(54) METHOD AND APPARATUS FOR MULTIPLEX TRANSMISSION

(75) Inventors: Masaki Ohira, Yokohama (JP); Masazumi Noguchi, Yokohama (JP); Takashi Mori, Yokohama (JP); Mitsunobu Kimura, Fujisawa (JP); Koji Kato, Zama (JP)

(73) Assignee: Hitachi, Ltd. (JP)

( * ) Notice: Subject to any disclaimer, the term of this patent is extended or adjusted under 35 U.S.C. 154(b) by 790 days.

(21) Appl. No.: 10/733,200

(22) Filed: Dec. 9, 2003

(65) Prior Publication Data

US 2004/0184403 A1    Sep. 23, 2004

Related U.S. Application Data

(63) Continuation of application No. 09/196,900, filed on Nov. 20, 1998, now Pat. No. 6,721,268.

(30) Foreign Application Priority Data

Nov. 27, 1997   (JP)   ................................. 9-342050

(51) Int. Cl.
  *H04L 1/00*   (2006.01)
(52) U.S. Cl. ................... 370/223; 370/227; 370/242; 370/248; 370/249
(58) Field of Classification Search ............... 370/222, 370/223, 224, 227, 228, 242, 244, 247, 248, 370/249, 250, 251
See application file for complete search history.

(56) References Cited

U.S. PATENT DOCUMENTS 5,265,096 A * 11/1993 Parruck ........................ 370/216
5,278,824 A    1/1994 Kremer ........................ 370/15
5,390,164 A    2/1995 Kremer ........................ 370/16.1
5,491,686 A    2/1996 Sato ............................ 370/16.1
5,537,393 A    7/1996 Shioda et al. ............... 370/16.1

(Continued)

FOREIGN PATENT DOCUMENTS

GB    2287596    9/1995

(Continued)

OTHER PUBLICATIONS

Zhi-Wei Lin: Support of optional selective protection lock-out for non-preemptible unprotected traffic(NUT) dated Jul. 16, 1996.

(Continued)

*Primary Examiner*—Chi Pham
*Assistant Examiner*—Shick Hom
(74) *Attorney, Agent, or Firm*—Sofer & Haroun, LLP

(57) ABSTRACT

In a transmission network including multiplex transmission units A, F, G, D and E, when the line breakage has occurred on the OC-12 transmission path of the direction from unit A to unit F, the unit F detects the signal coming in from the OC-12 path indicative of the line breakage. The unit F inserts the APS bytes which comes in from the unit A into the undefined area of the OC-192 transport overhead which is reserved for the through-transport of APS bytes, and transports it to the unit G. On receiving the through-transport APS bytes, the unit G inserts it intact into the defined area for the APS bytes in the OC-12 transport overhead, and sends it to the unit D. In this manner, protection switching between the units A and D is carried out.

4 Claims, 11 Drawing Sheets

∗∗ : K1 Tr#i BYTE=K1 BYTE FROM APPARATUS D
     K2 Tr#i BYTE=K2 BYTE FROM APPARATUS D
† : K1 Tr#i BYTE=K2 Tr#i BYTE=(FF)hex
※ : K1 BYTE=K2 BYTE=(FF)hex

U.S. PATENT DOCUMENTS

| | | | |
|---|---|---|---|
| 5,740,157 A | 4/1998 | Demiray et al. | 370/219 |
| 5,841,760 A | 11/1998 | Martin et al. | 370/242 |
| 6,055,226 A * | 4/2000 | Verpooten | 370/222 |
| 6,721,268 B1 * | 4/2004 | Ohira et al. | 370/223 |

OTHER PUBLICATIONS

European Search Report dated Jul. 2, 2002.

* cited by examiner

\* : K1 Tr#i BYTE=K1 BYTE FROM APPARATUS A
K2 Tr#i BYTE=K2 BYTE FROM APPARATUS A
\*\* : K1 Tr#i BYTE=K1 BYTE FROM APPARATUS D
K2 Tr#i BYTE=K2 BYTE FROM APPARATUS D

\*\* : K1 Tr#i BYTE=K1 BYTE FROM APPARATUS D
K2 Tr#i BYTE=K2 BYTE FROM APPARATUS D
† : K1 Tr#i BYTE=K2 Tr#i BYTE=(FF)hex
※ : K1 BYTE=K2 BYTE=(FF)hex \* : K1 Tr#i BYTE=K1 BYTE FROM APPARATUS A
K2 Tr#i BYTE=K2 BYTE FROM APPARATUS A
\*\* : K1 Tr#i BYTE=K1 BYTE FROM APPARATUS D
K2 Tr#i BYTE=K2 BYTE FROM APPARATUS D
※ : K1 BYTE=K2 BYTE=(FF)hex

FIG. 4

| OVERHEAD | | FUNCTION |
|---|---|---|
| SECTION OVERHEAD | A1, 2A | FRAME SYNCHRONIZATION |
| | B1 | ADMINISTRATION OF ERRORS IN SECTION INTERVAL |
| | D1~D3 | USED FOR MAINTENANCE OPERATION |
| | E1 | SPEECH COMMUNICATION FOR CRAFT MAN |
| | J0 (C1) | DESIGNATION OF OC-1 MULTIPLEX NUMBER OF OC-M SIGNAL |
| | F1 | USED FOR CONVENIENCE OF CRAFT MAN |
| LINE OVERHEAD | H1, H2 | INDICATION OF HEAD PHASE OF PATH |
| | H3 | USED FOR FREQUENCY SYNCHRONIZATION |
| | B2, M1 | ADMINISTRATION OF ERRORS IN LINE INTERVAL |
| | K1, K2 | SWITCHING CONTROL FOR LINE INTERVAL, TRANSFER OF ALARM |
| | D4~D12 | USED FOR MAINTENANCE OPERATION |
| | E2 | SPEECH COMMUNICATION FOR CRAFT MAN |
| | S1 | USED FOR OPERATION OF NETWORK SYNCHRONIZATION |
| | Z1, Z2 | INTERNATIONALLY RESERVED AS SPARE |

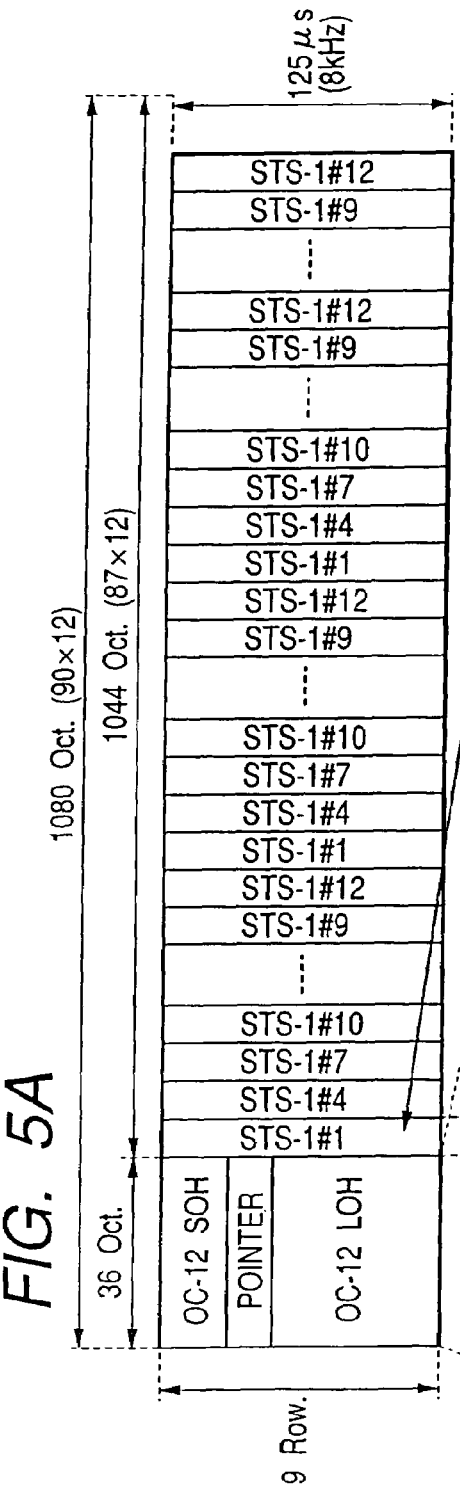
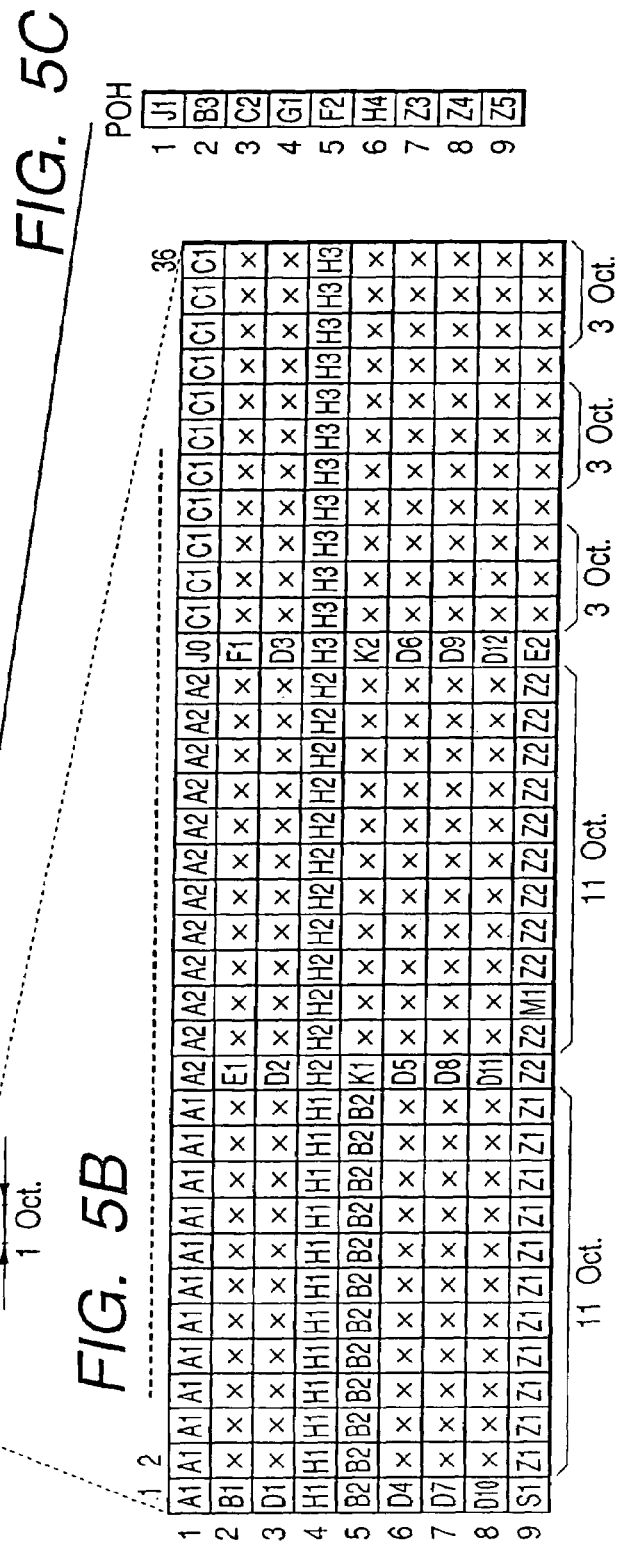
FIG. 5A
FIG. 5B
FIG. 5C

* : K1 Tr#i BYTE=K1 BYTE FROM APPARATUS A
  K2 Tr#i BYTE=K2 BYTE FROM APPARATUS A
** : K1 Tr#i BYTE=K1 BYTE FROM APPARATUS D
  K2 Tr#i BYTE=K2 BYTE FROM APPARATUS D

** : K1 Tr#i BYTE=K1 BYTE FROM APPARATUS D
  K2 Tr#i BYTE=K2 BYTE FROM APPARATUS D
† : K1 Tr#i BYTE=K2 Tr#i BYTE=(FF)hex
※ : K1 BYTE=K2 BYTE=(FF)hex

* : K1 Tr#i BYTE=K1 BYTE FROM APPARATUS A
  K2 Tr#i BYTE=K2 BYTE FROM APPARATUS A
** : K1 Tr#i BYTE=K1 BYTE FROM APPARATUS D
  K2 Tr#i BYTE=K2 BYTE FROM APPARATUS D
※ : K1 BYTE=K2 BYTE=(FF)hex

* : K1 Tr#i BYTE=K1 BYTE FROM APPARATUS A
  K2 Tr#i BYTE=K2 BYTE FROM APPARATUS A
** : K1 Tr#i BYTE=K1 BYTE FROM APPARATUS D
  K2 Tr#i BYTE=K2 BYTE FROM APPARATUS D
† : K1 Tr#i BYTE=K2 Tr#i BYTE=(FF)hex
※ : K1 BYTE=K2 BYTE=(FF)hex

METHOD AND APPARATUS FOR MULTIPLEX TRANSMISSION

RELATED APPLICATIONS

This application is a continuation of U.S. patent application Ser. No. 09/196,900, filed on Nov. 20, 1998, now U.S. Pat. No. 6,721,268 which in turn claims priority to Japanese Patent Application No. 9-342050, filed on Nov. 27, 1997, the entirety of which are hereby incorporated by reference. The Parent patent application Ser. No. 09/196,900 also pertains to Published Unexamined Patent Application No. Hei 9-321729 corresponding to U.S. patent application Ser. No. 08/863,675, the disclosures of which are also hereby incorporated by reference.

FIELD OF THE INVENTION

The present invention relates to a method and apparatus for multiplex transmission suitable for use in the Synchronous Digital Hierarchy.

BACKGROUND OF THE INVENTION

In today's digital transmission networks, the technology of synchronization has been advanced to such a degree that a communication network is synchronized with faster transmission apparatuses employing optical transmission. For functions and configurations of the digital transmission networks and transmission apparatuses, worldwide standards have been established such that a transmission apparatus and/or a communication network may be introduced in conformity to the standards to provide high quality transmission anywhere in the world. Examples of specific standards may include the standard (established in 1988) on a transmission system referred to as "SDH" (Synchronous Digital Hierarchy) defined in Recommendation G.707 and so on by International Telecommunication Union-Telecommunication Sector ("ITU-T"), and the standard (established in 1991) on a transmission system referred to as "SONET" (Synchronous Optical Network) defined in Standard T1.105 American National Standard Institute ("ANSI"), both of which define the configuration of optical synchronous communication systems and functions of transmission apparatuses.

The SDH and SONET standards are intended for the process (for transmission or multiplexing/demultiplexing) of synchronous multiplex signals (frames) which are the main signal section of digitized and multiplex main signals called "payload" added by signals called "transport overhead" used for the operation, administration, maintenance and provisioning (OAM&P) of the transmission equipment and communication network. The transport overhead has a pointer, which is used for the stuff control of phase accommodation and frequency justification. Based on this scheme, it becomes possible to provide a transmission system which is less susceptible to transmission delay and is superior in the OAM&P ability.

Transmission techniques based on this kind of transport overhead are disclosed in Japanese Published Unexamined Patent Application No. Hei 4-79628 and U.S. Pat. No. 5,682,257 for example. In regard to the transmission scheme with the intention of enhancing the latitude of SDH or SONET-based network organization, there is known suggestive article T1X1.5/96-085 addressed to ANSI for example.

The synchronous digital transmission network of this type uses the bidirectional line switched ring (BLSR) which is the ring-wise connection of OC-12 transmission paths for example. The transmission paths have their protection switching made conformable to the protocols of the Bidirectional Line Switched Ring stated in the ANSI Recommendation T1.105.01 and the MS Shared Protection Rings stated in the ITU-T Recommension G. 841. Specifically, the protection switching operation is carried out among plural multiplex units which constitute the ring network by use of the K1 byte and K2 byte, which are called "automatic protection switching (APS) bytes", placed in the transport overhead of synchronous-multiplex signals.

For grading up a transmission network, OC-12 paths in ring-wise connection are replaced partially with OC-192 paths which have a larger transmission capability. In this case, transaction of the above-mentioned K1 and K2 bytes needed for the protection switching operation is shut off at the multiplex transmission unit located between the OC-12 path and OC-192 path, causing the OC-12 ring network to fail to retain its protection switching operation. The reason is because the APS bytes sent over the OC-12 path is terminated by the multiplex unit connected at one end of the OC-192 path, and is not propagated to the counterpart of another end, as stated in the SONET and SDH standards. The APS bytes sent over the OC-192 path is used solely for the protection switching operation of the OC-192 path. Therefore, it is not easy in general to accomplish a network in which a section of the BLSR (Bidirectional Line Switched Ring) network of OC-M is multiplex to a network of OC-N (N is greater than M) having a larger transmission capability.

The sole feasible manner for this accomplishment is to send by through-transport the OAM&P information inclusive of the APS bytes, which comes in from the OC-12 path, through the OC-192 section. For example, it is assumed that multiplex units A, F, G, D and E form a BLSR network of A ⇆F ⇆G ⇆D ⇆E ⇆A, of which the F ⇆G is a high-speed OC-192 path section and the rest are low-speed OC-12 path sections. If a fault arises in the OC-12 path section E ⇆A, the multiplex units A and E detect the fault and transact the APS bytes which are coded in accordance with the BLSR protocol over the paths A ⇆F ⇆G ⇆D ⇆E by transporting through the OC-192 path section E ⇆G, thereby implementing the protectionswitching. This scheme allows a OC-12 ring network, even though it includes a OC-192 path, to retain the protection switching operation, and enables the network organization at a relatively high latitude.

However, the above-mentioned scheme can possibly fail to implement the protection switching in need in case a fault arises at a specific position of transmission paths. For example, if a fault arises in the transmission path section A ⇆F of the above-mentioned BLSR network, it is expected according to the above-mentioned scheme that the OAM&P information inclusive of the APS bytes from the OC-12 path should be sent by through-transport through the OC-192 path section and protection switching should be carried out. However, it does not take place this time. This fault differs from the above-mentioned case in that the faulty OC-12 path has its one end connected with the multiplex unit F which is connected to the OC-192 path. In such a case, even if the fault of the upstream path is indicated to the downstream multiplex unit D, BLSR switching (span switching or ring switching of BLSR) does not take place in the multiplex unit D. The following will explain the reason in detail.

In the SONET and SDH standards, it is stated that in response to the detection by a multiplex unit of a fault of transmission path such as the loss of signal, loss of frame, or AIS-L (or MS-AIS in the SDH), AIS-P (or AU-AIS in the SDH) which is the alarm for the STS path layer is transported to the downstream unit. The AIS-P is to set a "1"s bit string to the STS synchronous payload envelope and STS pointers (H1, H2 and H3 bytes). The OC-12 receiver of the unit F detects the loss of signal and transports the AIS-P to the downstream unit G. On receiving the AIS-P, the unit G further transports the AIS-P to the downstream unit D. However, in the SONET and SDH standards, the reception of AIS-P does not cause the BLSR switching of OC-12 paths.

Accordingly, any alarm information, either for transport overhead or payload, which causes the BLSR switching will not be transported depending on the faulty section, and therefore the BLSR switching of OC-12 paths which is needed for the unit D for example will not be implemented. Consequently, the OC-12 network is left unrecoverable. This signifies that the path which runs between the multiplex units A and D by way of the units F and G, for example, is left in the defective state, causing the OC-12 network to be inoperative.

A conceivable preventive manner against this impropriety is the multiplex units F and G installing the protection switching, i.e., BLSR switching, function for the OC-12 network, so that the units F and G are treated as nodes of the OC-12 network equally to the A and other multiplex units. Accordingly, the units F and G implement the BLSR switching of OC-12 paths in accordance with the APS bytes of the transmission frame of OC-12. At that time, the APS bytes for the BLSR switching of the OC-12 paths is sent through the OC-192 path section between the units F and G by being inserted into the undefined area of the line overhead of the OC-192 transmission frame. The BLSR switching is implemented by the unit G instead of F since a partial band of the OC-192 path cannot be operated for the OC-12 BLSR. This manner, however, necessitates the BLSR switching function for a maximum of 16 low-speed OC-12 paths, and it is not realistic from the viewpoints of system scale and cost.

The foregoing is an example of a fault occurring on the OC-12 path of the direction from unit A to unit F, and it is also relevant to a fault occurring on the OC-12 path of the direction from unit D to unit G. Moreover, in the event of a fault which is irrecoverable by the protection switching, e.g., simultaneous switching failure of the working line and protection line, on the OC-192 path between the units F and G, which is the case of demand of BLSR switching by the units A and D, switching does not take place by the same reason as described above.

A problem involved in the art stated above is that at the occurrence of a fault on a OC-M transmission path which is immediately preceding the multiplexing to a high-speed OC-N signal (N is greater than M), or at the occurrence of a fault which is irrecoverable by the protection switching on the OC-12 path, the protection switching which is inherently the case of demand by the OC-M network is not implemented and moreover the system is left in a state in which the OC-M signal is treated to be normal.

SUMMARY OF THE INVENTION

Accordingly, it is an object of the present invention to provide a method and apparatus for multiplex transmission which are capable of implementing the protection switching of transmission paths reliably.

The above objective is achieved in such a manner that at the occurrence of a fault on a low-speed transmission path which is immediately preceding the multiplexing to a high-speed transmission path, an alarm is sent by through-transport to the high-speed path by being inserted into a certain location of the transport overhead of the multiplex signal of the high-speed path. The location of insertion of the transport overhead is a predetermined undefined area, and the alarm is such a signal having low-order 3 bits of "111".

At the occurrence of a fault on a high-speed transmission path which is immediately preceding the demultiplexing to a low-speed transmission path, an alarm is transported to the low-speed path by being inserted into a certain location of the transport overhead of the multiplex signal of the low-speed path. At the occurrence of a fault on a high-speed transmission path of a multiplex transmission unit which is located between two high-speed paths, an alarm is sent by through-transport to the high-speed path by being inserted into a certain location of the transport overhead of the multiplex signal of the high-speed path.

The arrangement in this manner ensures the alteration of the configuration of transmission network and the operation of protection switching of transmission paths. The inventive method and apparatus are capable of accomplishing a multiplex transmission equipment and multiplex transmission network having the invariable ability of protection switching operation even if the transmission network is altered.

It should be noted that throughout this patent specification, the term "low-speed path" signifies a transmission path which carries low-speed signals, and the term "high-speed path" signifies a transmission path which carries high-speed signals. The low-speed signal is a multiplex signal having a lower bit rate and the high-speed signal is a multiplex signal having a higher bit rate in a sense of relativity.

BRIEF DESCRIPTION OF THE DRAWINGS

Preferred embodiments of the present invention will now be described in conjunction with the accompanying drawings, in which:

FIG. 4 is a table showing the functions of the transport overhead of the multiplex signal;

FIGS. 5A, 5B and 5C are diagrams showing the forms of frame, transport overhead and STS path overhead, respectively, of a low-speed multiplex signal (OC-12);

FIGS. 6A, 6B and 6C are diagrams showing the forms of frame, transport overhead and STS path overhead, respectively, of a high-speed multiplex signal (OC-192);

FIG. 7 is a diagram used to explain the through-transport of the transport overhead;

FIG. 8 is a diagram used to explain in detail the through-transport of the transport overhead;

FIG. 9 is a diagram used to explain in detail the through-transport of the transport overhead;

FIG. 10 is a diagram used to explain in detail the through-transport of the transport overhead;

DESCRIPTION OF THE PREFERRED EMBODIMENTS

Preferred embodiments of the present invention will be explained with reference to the drawings. Although the following embodiments deal with the SONET-based transmission, the invention is equally applicable to the SDH-based transmission.

The inventive method and apparatus are designed to terminate the transport overhead of the transmission frame at each node and transport the specified transport overhead through. Namely, this invention is intended to transport an alarm, which will cause the protection switching of transmission paths, to the path section between intended nodes of the transmission network, thereby retaining the ability of operation, administration, maintenance and provisioning (OAM&P) of the transmission system, particularly the ability of protection switching operation of transmission paths at the occurrence of a fault.

Figure 1:
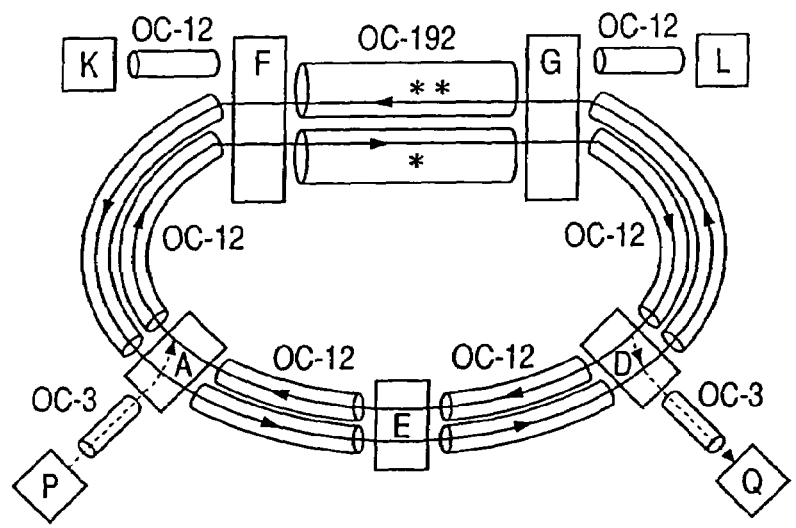
FIG. 1 is a block diagram of a multiplex network in the normal state.

FIG. 1 shows a ring-shaped multiplex network. In the network, multiplex units are connected by OC-12 transmission paths, except that units F and G are connected by an OC-192 transmission path. The figure shows the normal state of the network without a fault in all path sections among the units A, F, G, D and E. The APS bytes originating from the units A and D go through the path section between the units F and G and reach the units D and A, respectively.

The OC-192 path is of the four-fiber type, with its protection switching scheme being linear 1+1, which is stated in the ANSI Recommendation T1.105.01 of the SONET standard or in the ITU-T Recommendation G.783 of the SDH standard.

Although the multiplex units F and G which constitute nodes of the high-speed OC-192 network are of the LTE type in the following explanation, these multiplex units may be of the ADM type. Whereas, the multiplex units A, D and E which constitute nodes of the low-speed OC-12 network are of the usual ADM type, and these units may not have the overhead through-transport function. The arrangement of the multiplex units of both types will be explained later.

The multiplex unit F transmits intact a signal having the bandwidth for working and a signal having the bandwidth for protection from the unit A over the OC-12 path by using the working or both the working and protection OC-192 paths. Similarly, the multiplex unit G transmits intact signals from the unit D over the working and protection OC-12 paths by using the working or both the working and protection OC-192 paths. Shown in FIG. 1 is the case of using the working OC-192 path, with the protection OC-192 path being omitted. The OC-12 BLSR network, which is of the two-fiber type in the following explanation, may be of the four-fiber type.

FIG. 1 also shows by the dashed line a STS-3 like path which runs between the multiplex units A and D by way of the OC-192 path between the units F and G. This STS-3 like path is branched to OC-3 paths (155.52 MHz) at the units A and D.

Figures 6A, 6B, 6C:
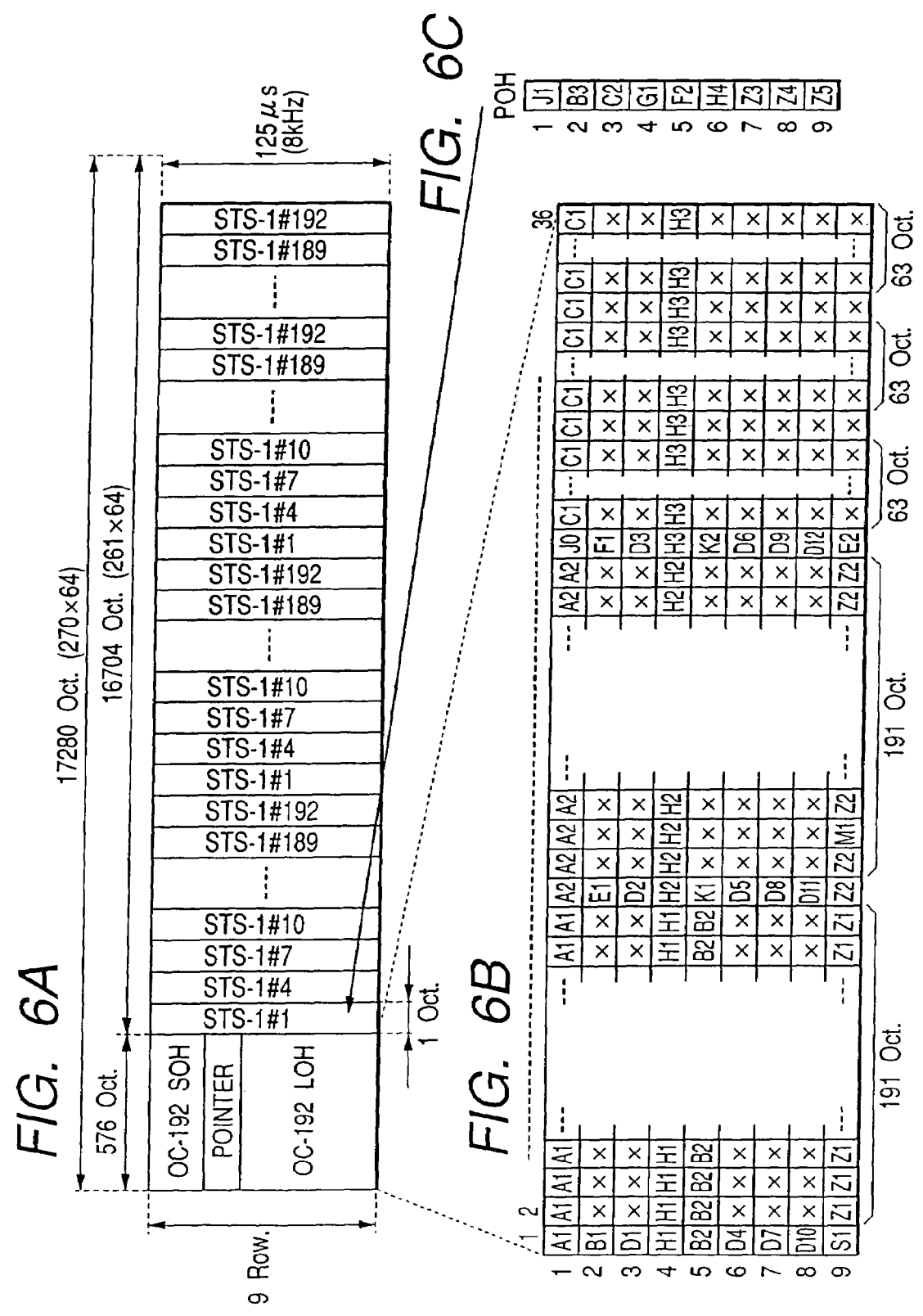

The frame form of multiplex signals in this multiplex network will be explained in the following. FIGS. 5A, 5B and 5C show the frame form of the multiplex signal on the OC-12 path (622.08 MHz) stated in the SONET standard. In this frame form, the signals of 36 leading octets in FIG. 5A are the transport overhead and the rest are the payload of multiplex main signals. FIG. 5B shows the details of the transport overhead, and FIG. 5C shows the content of the 1-octet STS path overhead (POH). FIGS. 6A, 6B and 6C show the frame form of the multiplex signal on the OC-192 path (9953.28 MHz) stated in the SONET standard. In this frame form, the signals of 576 leading octets in FIG. 6A are the transport overhead and the rest are the payload of multiplex main signals. FIGS. 6B and 6C show the details of the transport overhead and the content of the POH, respectively.

Among the transport overheads shown in FIGS. 5B and 6B, columns 1, 2 and 3 are called "section overhead". The section overhead is used for the OAM&P of each path segment (defined to be "section") between transmission units or relay units. A section overhead created by one transmission unit (or relay unit) is sent to the neighboring unit over the transmission path, and terminated by it. Columns 5 through 9 of the transport overhead is called "line overhead". The line overhead is used for the OAM&P of each path segment (defined to be "line") between transmission units which deal with multiplex main signals. A line overhead created by one transmission unit is sent to the neighboring unit via a transmission path and relay unit, and terminated by it. Bytes on row 4 of the transport overhead are pointers. Indicated by "X" are unused bytes (undefined areas). In regard to the undefined area, the suggestive article T1X1.5/96-085 addressed to ANSI describes a concept of inserting the APS bytes from a OC-M network into the undefined areas of the line overhead of the transmission frame of OC-N (N is greater than M).

The functions of individual parts of transport overhead are as shown in FIG. 4. Among the items of the section overhead, A1 and A2 are for framing, B1 is for error monitoring within the section layer, D1-D3 are for OAM, especially data communication, E1 is for voice communication, J0 is for section tracing, and Z0 is reserved for future use. Among the items of the line overhead, H1 and H2 are for indicating the first byte of STS synchronous payload envelope, H3 is for frequency justification, B2 and M1 are for error monitoring within the line layer, K1 and K2 are for automatic protection switch signaling and alarm transport, D4-D12 are for OAM, E2 is for voice communication, S1 is the synchronization status, and Z1 and Z2 are reserved for future use. These frame form and functions are all stated in the above-mentioned standards.

The following explains how various OAM&P information issued by the multiplex unit A and D are placed in which locations of the undefined area of the OC-192 transport overhead or sent by through-transport by the units F and G.

Figures 7, 8:
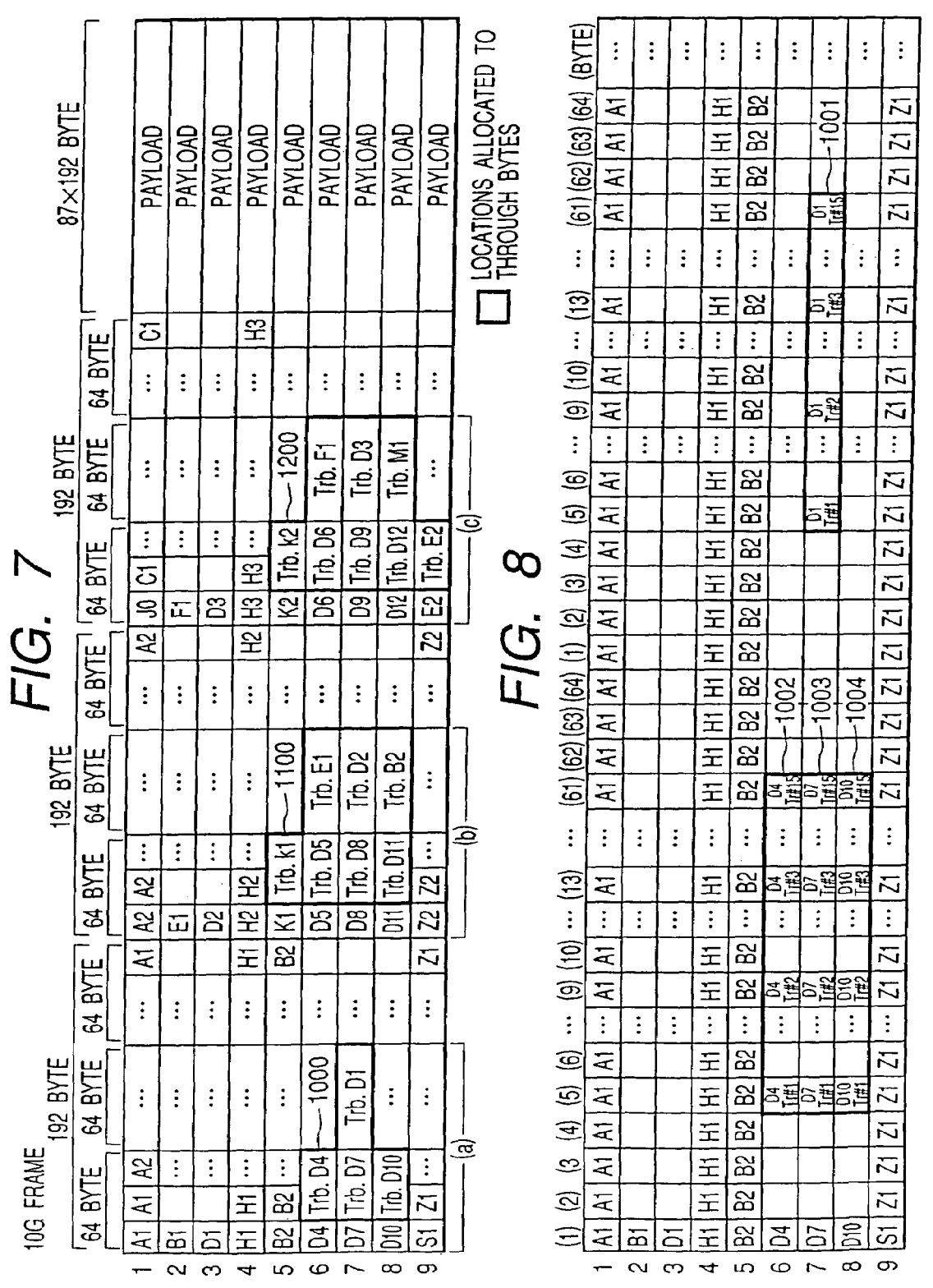

FIG. 7 shows the OC-192 transmission frame, in which the areas enclosed by the bold line are locations 1000, 1100 and 1200 allotted to through-bytes (bytes to be transported through). In case the low-speed signal to be multiplexed is OC-12, the areas indicated by (a), (b) and (c) in FIG. 7 have detailed forms as shown for example in FIGS. 8, 9 and 10, respectively. In these figures, the areas enclosed by the bold line are locations 1001-1004, 1101-1107, and 1201-1208 allotted to the through-bytes.

The multiplex units F and G insert the APS bytes of the OC-12 transmission frame coming from the units A and D, i.e., K1 and K2 bytes, into the locations indicated by "Trb.K1" and "Trb.K2" in FIG. 7. More detailed locations of insertion are shown by "K1Tr#i" 1104 in FIG. 9 and "K2Tr#i" 1204 in FIG. 10 (where i is an integer greater than 0 and smaller than 16). Areas used for the through-transport of OAM&P information other than the APS bytes, e.g., bytes D4-D12, are indicated by "Trb.D4" through "Trb.D12" in FIG. 7, and these areas are shown in more detail in FIGS. 8, 9 and 10. The OAM&P information may be placed in any undefined area of the line overhead, instead of the above example shown in FIGS. 8, 9 and 10.

The following deals with the occurrence of a fault on a transmission path in the multiplex network shown in FIG. 1 during the transmission of a multiplex signal having the above-mentioned frame form.

Figure 2:
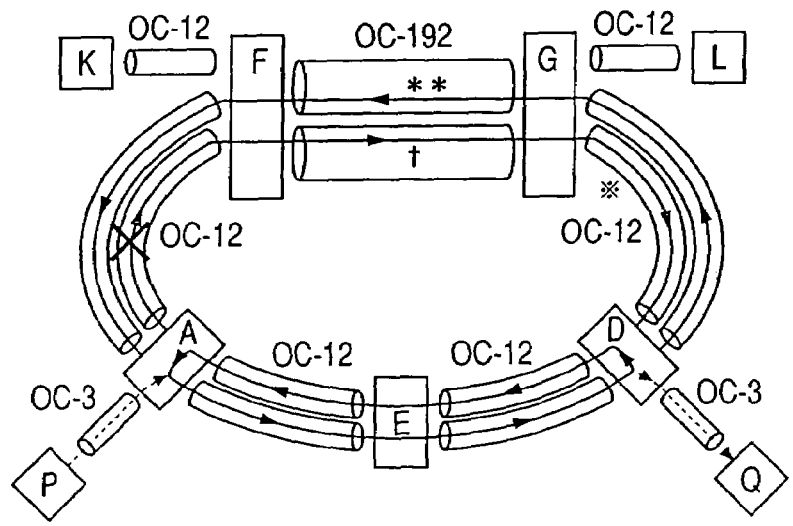
FIG. 2 is a block diagram showing the states of the multiplex network, with the inventive transmission method being applied thereto.

FIG. 2 shows the case of a line break occurring on the OC-12 path of the direction from unit A to unit F. The unit F detects the loss of signal (LOS) for the incoming signal from the OC-12 path, and then suspends the through-transport of the APS bytes from unit A to unit G. Specifically, the unit F inserts, into the locations indicated by "K1Tr#i" in FIG. 9 and "K2Tr#i" in FIG. 10 (where i is an integer greater than 0 and smaller than 16), a signal having low-order 3 bits of "111" at least for the "K2Tr#i". This signal can be, "11111111", i.e., "FF" in hexadecimal, for example. The unit F keeps inserting the signal in each frame until the transmission path recovers from the fault.

Figures 9, 10:
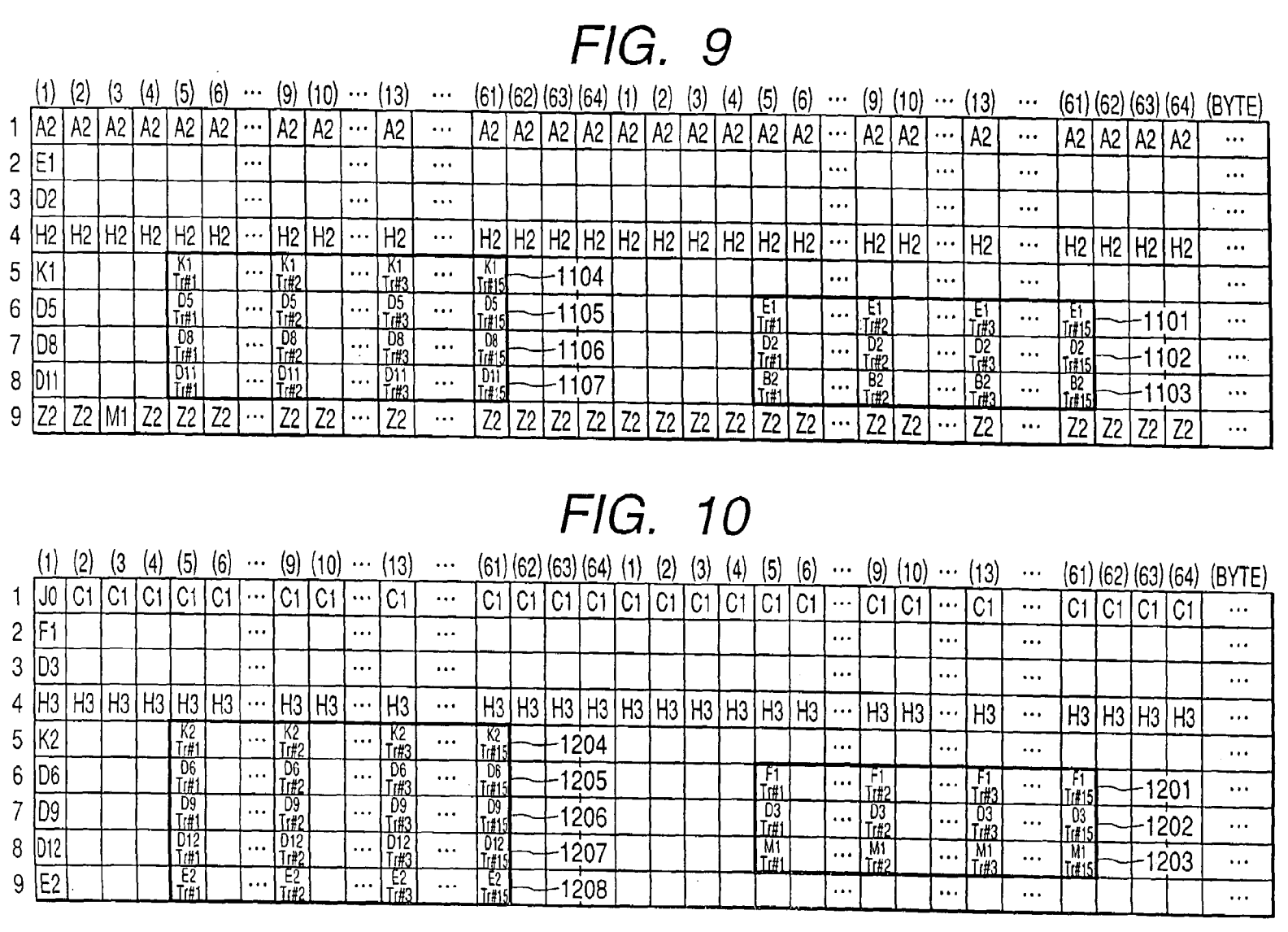

The unit G inserts intact the received APS bytes which have been transported through, i.e., the contents of "K1Tr#i" in FIG. 9 and "K2Tr#i" in FIG. 10, into the defined areas for the APS bytes in the OC-12 transport overhead, i.e., locations of K1 and K2 in FIG. 5B, and sends the resulting APS bytes to the unit D. Accordingly, the unit D receives the APS bytes of "11111111" from the unit G.

It is stated in the SONET standard that the reception of the K2 byte having low-order 3 bits of "1111" for five consecutive frames or more indicates the transport of AIS-L which is the line layer alarm. The standard also states the AIS-L to be one of the alarms which cause the BLSR switching. Accordingly, the unit D determines the transport of line layer alarm AIS-L from the unit G. Namely, the alarm which causes the BLSR switching is transported up to the multiplex unit D.

In consequence of the foregoing development following the occurrence of the fault shown in FIG. 2, the BLSR switching is implemented for the path section between the units A and D, and the STS-3 like path shown by the dashed line between the units A and D is relieved. Specifically, the APS bytes are transacted between the units A and D by way of the unit E until the BLSR switching completes, while at the same time the APS bytes are sent by through-transport from unit D to unit A via the OC-192 path continuously in the same manner as the case shown in FIG. 1.

The transport of alarm from unit A to unit D via the OC-192 path continues even after the BLSR switching has completed until the transmission path recovers from the fault. After the recovery of the fault, the unit F sends by through-transport intact the APS bytes coming from the unit A to the unit G in the same manner as shown in FIG. 1. The unit D does not detect the alarm any longer, and the OC-12 network recovers from the BLSR switching state to restore the normal operation shown in FIG. 1.

Based on this transmission scheme, at the occurrence of a fault on the transmission path which is immediately preceding the multiplexing to the OC-192 signal, it is possible to transport the alarm which is needed for the protection switching of transmission paths in the OC-12 network, irrespective of the presence or absence of a section terminating equipment such as a repeater in the high-speed OC-192 path section, whereby a multiplex transmission apparatus and multiplex transmission network which are independent of the alteration of network configuration and have the superior OAM&P functions can readily be accomplished.

Figure 3:
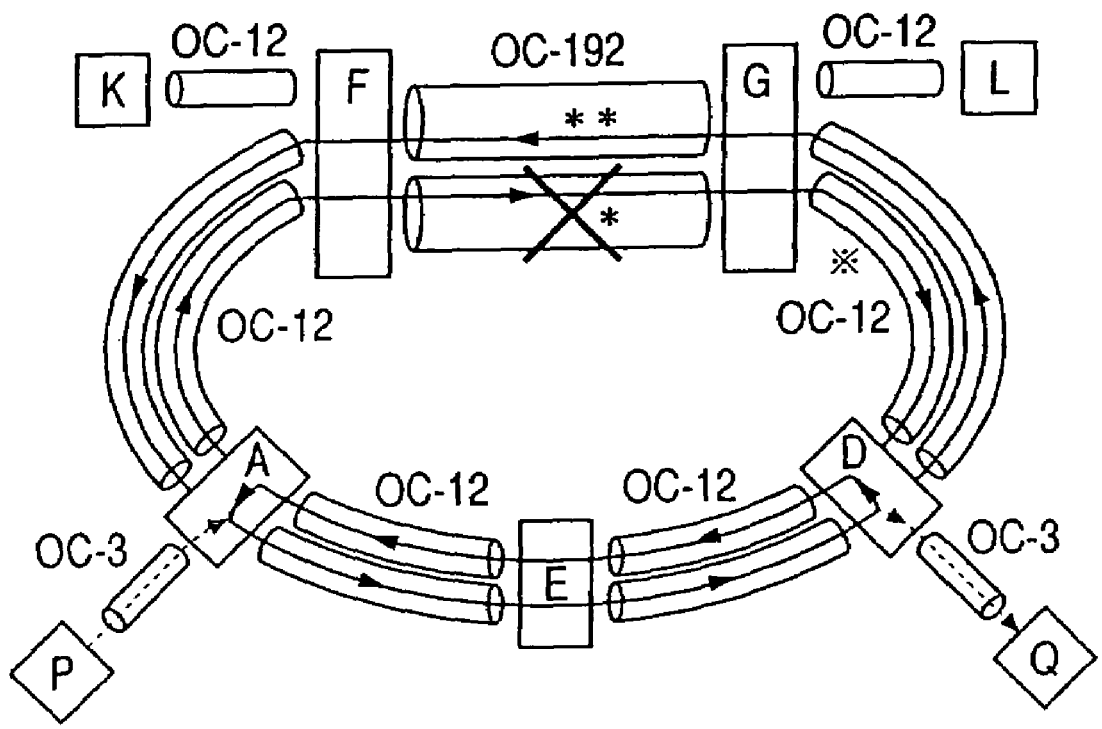
FIG. 3 is a block diagram showing the states of the multiplex network, with the inventive transmission method being applied thereto.

FIG. 3 shows the case of line breaks occurring simultaneously on the working and protection lines of the OC-192 path of the direction from unit F to unit G. Due to the line breakage, the protection switching of the OC-192 path does not take place.

The unit G detects the LOS for the incoming signal from the OC-192 path, and then inserts, into certain locations for the APS bytes (K1 and K2) of the OC-12 transport overhead, a signal having low-order 3 bits of "111" at least for the K2 byte. This signal can be "11111111", i.e., "FF" in hexadecimal, for example. The unit G keeps inserting the signal in each frame and sending the resulting APS bytes to the unit D until the transmission path recovers from the fault.

On receiving the signal, the unit D determines the transport of line layer alarm AIS-L from the unit G. It means that the alarm which causes the BLSR switching is transported up to the unit D. In consequence, the BLSR switching is implemented for the path section between the units A and D, and the STS-3 like path shown by the dashed line between the units A and D is relieved as shown in FIG. 3.

Consequently, at the occurrence of a fault which is irrecoverable by the protection switching on the OC-192 path, it is possible to transport the alarm which is needed for the protection switching of transmission paths in the OC-12 network, irrespective of the presence or absence of a section terminating equipment such as a repeater in the high-speed OC-192 path section, whereby a multiplex transmission apparatus and multiplex transmission network which are independent of the alteration of network configuration and have the superior OAM&P functions can readily be accomplished.

Although the embodiments shown in FIG. 2 and FIG. 3 are of the cases of line breakage on the transmission paths, these schemes are also applicable to other faults caused by the degradation of transmission path, provided that a multiplex unit which receives the signal of fault occurrence can detect the LOF and AIS-L and the SF and SD related to the deterioration of error rate of the transmission path.

Specifically, at the occurrence of this kind of fault on a low-speed OC-M path which is immediately preceding the multiplexing to a high-speed path of OC-N (N is greater than M) as shown in FIG. 2, the above-mentioned alarm is inserted into a certain location of the undefined area of the transport overhead of the OC-N frame and sent by through-transport through the high-speed OC-N path, so that the protection switching operation of the low-speed OC-M path is induced. At the occurrence of this kind of fault on a high-speed OC-N path which is immediately preceding the demultiplexing to a low-speed OC-M path as shown in FIG. 3, the above-mentioned alarm is inserted directly into the APS bytes of the OC-M frame and sent to the low-speed OC-M path, so that the protection switching operation of the low-speed path is induced.

This alarm transport scheme is also applicable to the case of sending by through-transport the OAM&P information of the low-speed network through the high-speed network by way of three nodes, as will be explained in the following embodiment. The term "node" signifies a multiplex unit having at least both the section termination function and line termination function.

Figure 11:
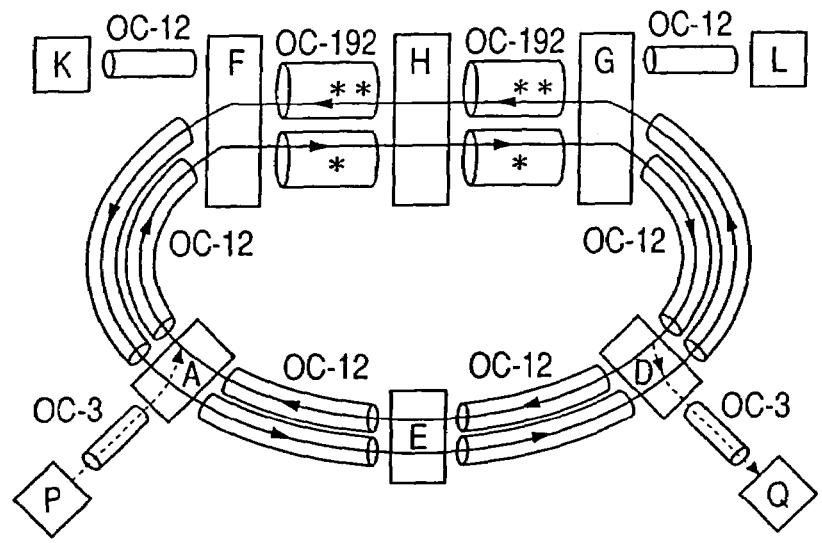
FIG. 11 is a block diagram of a multiplex network in the normal state.

FIG. 11 shows a multiplex network in which the OC-192 network includes three OC-192 multiplex units F, H and G connected tandem. The figure shows the normal state of the network without a fault in all path sections among the units A, F, H, G, D and E. This network configuration is exactly the same as that shown in FIG. 1, except for the presence of the unit H. The OC-192 path is of the four-fiber type, with its protection switching scheme being linear 1+1. The OAM&P information of the low-speed network is placed in the same undefined areas of the OC-192 transport overhead as in the case of the preceding embodiment.

The multiplex unit H is of the ADM type, which will be explained later. The OC-12 path of BLSR network is not demultiplexed at the unit H, but it merely serves for the through-transport of the high-speed signal of OC-192 of one direction and the high-speed signal of oc-192 of another direction. Specifically, the STS-12 like path from the unit A multiplexed by the unit F is demultiplexed entirely by the unit G, and it reaches the unit D via the OC-12 path. Another STS-12 like path from the unit D multiplexed by the unit G is demultiplexed entirely by the unit F, and it reaches the unit A via the OC-12 path.

The multiplex unit H inserts intact the contents of the undefined areas (e.g., "K1Tr#i" in FIG. 9 and "K2Tr#i" in FIG. 10) in the OC-192 transport overhead, which are reserved for the through-transport of APS bytes in the OC-192 transmission frame received from the unit F, into the undefined areas (e.g., "K1Tr#j" in FIG. 9 and "K2Tr#j" in FIG. 10) in the OC-192 transport overhead which are reserved for the through-transport of APS bytes in the OC-192 transmission frame to be sent to the unit G. The arguments i and j can be a same integer or different integers greater than 0 and smaller than 16. For example, in case the time slot position allotted to the STS-12 like path from the OC-12 BLSR in the OC-192 frame is not converted at the front and end of the unit H, a same value is set to the arguments i and j. Otherwise, in the case of the conversion of time slot position, the value corresponding to the time slot position after conversion is set to the argument j. In any case, at demultiplexing by the units F and G, the "K1Tr#j" and "K2Tr#j" corresponding to the "K1Tr#i" and "K2Tr#i" are demultiplexed. For the sake of simplicity of the following explanation, the arguments i and j are given the same value as the case without the conversion of time slot position.

Figure 12:
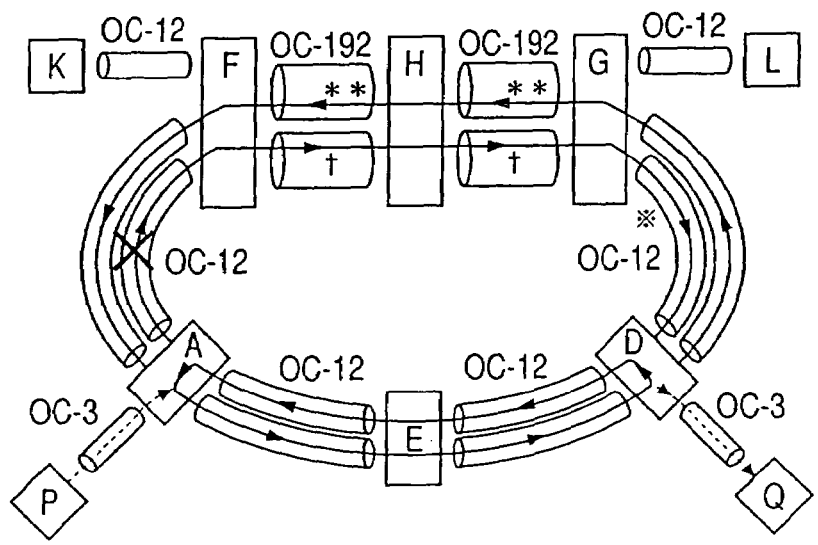
FIG. 12 is a block diagram showing the states of the multiplex network, with the inventive transmission method being applied thereto.

FIG. 12 shows the case of a fault such as a line break occurring on the OC-12 path of the direction from unit A to unit F. The units F and G have the same operations as the preceding case of FIG. 2, while the unit H has the same operation as the preceding case of FIG. 11. Specifically, the unit F detects the LOS for the incoming signal from the OC-12 path, and, at the through-transport of the APS bytes from unit A to unit G, it inserts, in the undefined areas (e.g., "K1Tr#i" in FIG. 9 and "K2Tr#i" in FIG. 10) in the OC-192 transport overhead which are reserved for the through-transport of APS bytes, a signal having low-order3 bits of "111" at least for the "K2Tr#i". This signal can be "11111111", i.e., "FF" in hexadecimal, for example. The unit F keeps inserting the signal in each frame until the transmission path recovers from the fault.

The unit G inserts intact the contents of the received APS bytes which have been transported through, i.e., "K1Tr#i" in FIG. 9 and "K2Tr#i" in FIG. 10, into the defined areas for the APS bytes (K1 and K2) in the OC-12 transport overhead, and sends the resulting APS bytes to the unit D in the same manner as the operation of FIG. 11.

The unit D determines the transport of line layer alarm AIS-L from the unit G. It means that the alarm which causes the BLSR switching is transported up to the unit D. In consequence, the BLSR switching is implemented for the path section between the units A and D in the OC-12 network, and the STS-3 like path shown by the dashed line between the units A and D is relieved.

Consequently, at the occurrence of a fault on the OC-12 path which is immediately preceding the multiplexing to the high-speed OC-192 signal, it is possible to transport the alarm which is needed for the protection switching of transmission paths in the OC-12 network, irrespective of the presence or absence of a section terminating equipment such as a repeater in the high-speed OC-192 path section, whereby a multiplex transmission apparatus and multiplex transmission network which are independent of the alteration of network configuration and have the superior OAM&P functions can readily be accomplished.

Figure 13:
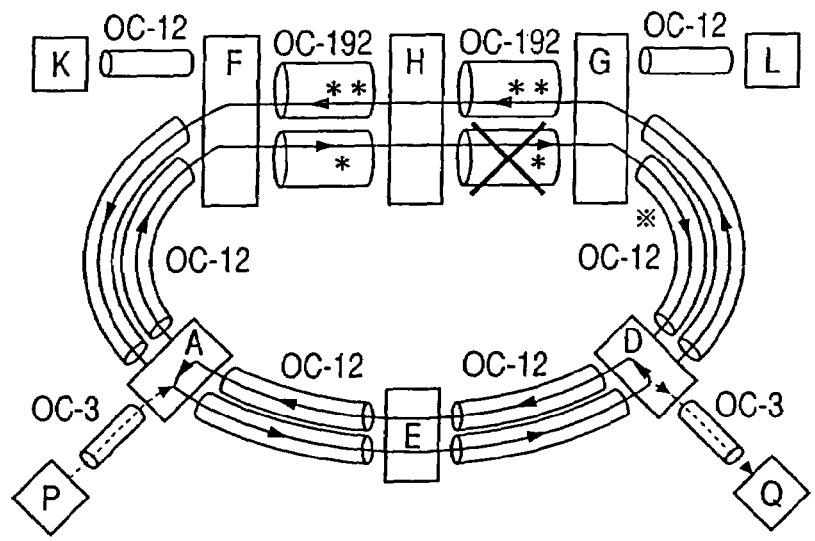
FIG. 13 is a block diagram showing the states of the multiplex network, with the inventive transmission method being applied thereto.

FIG. 13 shows the case of faults such as simultaneous line breaks occurring on the working and protection lines of the OC-192 path of the direction from unit H to unit G. Due to the line breakage, the protection switching of the OC-192 path does not take place.

The units F and G have the same operations as the preceding case of FIG. 3, while the unit H has the same operation as the preceding case of FIG. 11. Specifically, the unit G detects the LOS for the incoming signal from the OC-192 path, and then inserts, to the locations of K1 and K2 of the OC-12 transport overhead, a signal having low-order 3 bits of "111" at least for the K2 byte. This signal can be "11111111", i.e., "FF" in hexadecimal, for example. The unit G keeps inserting the signal in each frame and sending the resulting APS bytes to the unit D until the transmission path recovers from the fault.

The unit D determines the transport of line layer alarm AIS-L from the unit G as in the case of FIG. 2. It means that the alarm which causes the BLSR switching is transported up to the unit D. In consequence, the BLSR switching is implemented for the path section between the units A and D, and the STS-3 like path shown by the dashed line between the units A and D is relieved.

Consequently, at the occurrence of a fault which is irrecoverable by the protection switching on the high-speed OC-192, it is possible to transport the alarm which is needed for the protection switching of transmission paths in the OC-12 network, irrespective of the presence or absence of a section terminating equipment such as a repeater in the high-speed OC-192 path, whereby a multiplex transmission apparatus and multiplex transmission network which are independent of the alteration of network configuration and have the superior OAM&P functions can readily be accomplished.

Figure 14:
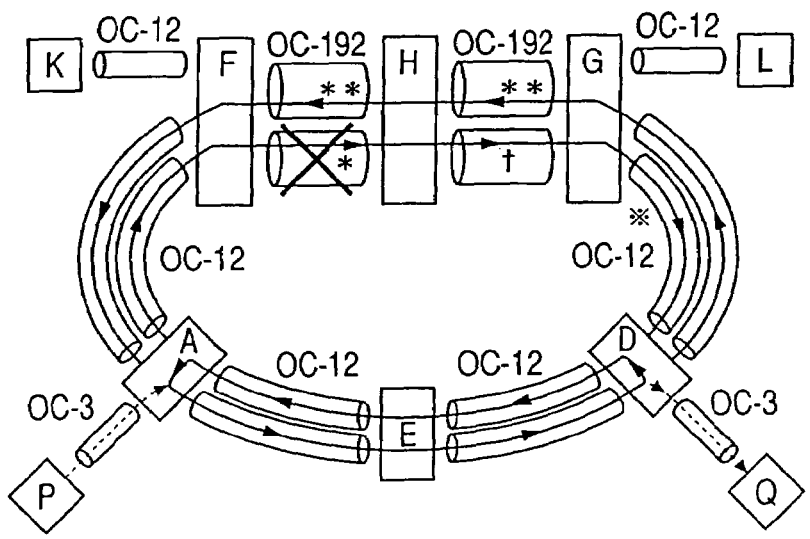
FIG. 14 is a block diagram showing the states of the multiplex network, with the inventive transmission method being applied thereto.

FIG. 14 shows the case of faults such as simultaneous line breaks occurring on the working and protection lines of the OC-192 path of the direction from unit F to unit H. Due to the line breakage, the protection switching of the OC-192 path does not take place. The units F and G have the same operations as the preceding case of FIG. 11, and only the unit H operates differently from the case of FIG. 11, as will be explained in the following.

The unit H detects the LOS for the incoming signal from the OC-192 path, and then it inserts a signal having low-order 3 bits of "111" at least for the "K2Tr#i" out of the "K1Tr#i" and "K2Tr#i" which are sent to the unit G. This signal can be "11111111", i.e., "FF" in hexadecimal, for example. The unit H keeps inserting the signal in each frame and sending the resulting APS bytes to the unit G until the transmission path recovers from the fault.

The unit G inserts intact the contents of the received APS bytes which have been transported through, i.e., "K1Tr#i" in FIG. 9 and "K2Tr#i" in FIG. 10, into the defined areas for the APS bytes (K1 and K2) in the OC-12 transport overhead, and sends the resulting APS bytes to the unit D in the same manner as the operation of FIG. 11.

The unit D determines the transport of line layer alarm AIS-L from the unit G, as in the case of FIG. 2. It means that the alarm which causes the BLSR switching is transported up to the unit D. In consequence, the BLSR switching is implemented for the path section between the units A and D in the OC-12 network, and the STS-3 like path shown by the dashed line between the units A and D is relieved.

Consequently, at the occurrence of a fault path which is irrecoverable by the protection switching on the high-speed OC-192 path, it is possible to transport the alarm which is needed for the protection switching of transmission paths in the OC-12 network, irrespective of the presence or absence of a section terminating equipment such as a repeater in the high-speed OC-192 path section, whereby a multiplex transmission apparatus and multiplex transmission network which are independent of the alteration of network configuration and have the superior OAM&P functions can readily be accomplished.

Although the embodiments shown in FIG. 11 through FIG. 14 are of the cases of line breakage on the transmission paths, these schemes are also applicable to other faults caused by the degradation of transmission path, provided that a multiplex unit which receives the signal of fault occurrence can detect the LOF and AIS-L and the SF and SD related to the deterioration of error rate of the transmission path.

Specifically, at the occurrence of any of these faults on a low-speed OC-M path which is immediately preceding the multiplexing to a high-speed path of OC-N (N is greater than M) as shown in FIG. 12, the above-mentioned alarm is inserted into a certain location of the undefined area of the transport overhead of the OC-N frame and sent by through-transport through the high-speed OC-N path, so that the protection switching operation of the low-speed OC-M path is induced. At the occurrence of any of these faults on a high-speed OC-N path which is immediately preceding the demultiplexing to a low-speed OC-M path as shown in FIG. 13, the above-mentioned alarm is inserted directly into the APS bytes of the OC-M frame and sent to the low-speed path, so that the protection switching operation of the low-speed path is induced. At the occurrence of any of these faults on a high-speed OC-N path which is immediately preceding the intermediate node on that path as shown in FIG. 14, the above-mentioned alarm is inserted into a certain location of the undefined area of the transport overhead of the OC-N frame and sent by through-transport through the remaining section of the high-speed path, so that the protection switching operation of the low-speed path is induced.

Although the foregoing embodiments shown in FIG. 11 through FIG. 14 are the transport of alarm of the case of the high-speed network having three nodes, the number of nodes may be more than three. In case it is intended to feed through the maintenance information of the low-speed network through a section of the high-speed network, the processes carried out by the nodes at both ends of the high-speed network are the same as those of the multiplex units F and G and the process of all nodes existing in that section are the same as that of the unit H explained above.

Although the foregoing embodiments shown in FIG. 1 through FIG. 3 and FIG. 11 through FIG. 14 are of the case of the high-speed OC-192 path and its protection switching scheme of linear 1+1 of four-fiber type, they may be linear 1:N (N is an integer greater than 0), BLSR of four-fiber type, or BLSR of two-fiber type. The switching scheme of linear 1:N is stated in the ANSI Recommendation T1.105.01 of the SONET standard and in the ITU-T Recommendation G.783 of the SDH standard. In any switching scheme, the low-speed network detects the AIS-L alarm at the occurrence of a fault on the OC-12 path which is immediately preceding the multiplexing to the high-speed OC-192 signal, or at the occurrence of a fault which is irrecoverable by the protection switching on the high-speed OC-192 path. Based on this scheme, it is possible to implement the protection switching of transmission paths in the OC-12 network reliably.

Although the foregoing embodiments are of the case of the low-speed OC-12 network being a BLSR, it may be a so-called linear-type network having a protection switching scheme of linear 1+1 or linear 1:N (N is an integer greater than 0). In any switching scheme, causes of switching include the AIS-L alarm, and therefore at the occurrence of a fault on the OC-12 path which is immediately preceding the multiplexing to the high-speed OC-192 signal, or at the occurrence of a fault which is irrecoverable by the protection switching on the high-speed OC-192 path, it is possible to implement the protection switching of transmission paths in the OC-12 network reliably.

Although in the foregoing embodiments, the low-speed network and the high-speed network, with the former being multiplexed to the latter, have transmission speeds of OC-12 and OC-192, respectively, the low-speed and high-speed networks can generically have speeds of OC-M and OC-N, where N is a multiple of M. Although in the foregoing embodiments of FIG. 11 through FIG. 14, the high-speed paths between the multiplex units F and H and between H and G have a same transmission speed of OC-192, these sections may have different speeds. For example, the path between the units F and H has speed OC-N' and the path between the units H and G has speed OC-N, where N and N' are both multiples of M.

Although in the foregoing embodiments, the "K1Tr#i" and "K2Tr#i" defined in the undefined area of the line overhead of the OC-N frame are used for the transport of alarm through the high-speed OC-N path section, an alternative scheme is to define multiple bytes dedicated to alarm transport (will be called "TTAIS bytes") in correspondence to multiple low-speed signals to be multiplexed. For example, the multiplex unit F, which has detected a fault on the low-speed OC-M path immediately preceding the multiplexing to the high-speed path, inserts a certain code, e.g., "F0" in hexadecimal, indicative of the alarm to the corresponding TTAIS byte and sends the resulting byte to the high-speed path OC-N (N is greater than M). The multiplex unit G, when it detects the TTAIS byte of the alarm code, e.g., "F0" in hexadecimal, from the high-speed path OC-N or when it detects a fault on the high-speed path which is immediately preceding the demultiplexing to the low-speed path, inserts, to the APS bytes, i.e., K1 byte and K2 byte, of the corresponding OC-M frame, the above-mentioned alarm, i.e., a signal having low-order 3 bits of "111" at least for the K2 byte, e.g., "11111111" ("FF" in hexadecimal), and sends the resulting APS bytes to the low-speed path. The multiplex unit H which becomes the intermediate node, when it detects a fault on the high-speed OC-N path, inserts a certain code, e.g., "F0" in hexadecimal, of the alarm to the TTAIS byte, and sends the resulting byte to the high-speed OC-N path.

Although in the foregoing embodiments, the alarm information which has been transported through the high-speed OC-N path section is sent to the low-speed path by being inserted into the APS bytes of the transport overhead of the low-speed OC-M frame, it may be sent to the low-speed path by use of the framing bytes of transport overhead of the low-speed signal or, alternatively, the transmission of the low-speed signal may be halted in response to the through-transported alarm information having a certain code value indicative of the alarm.

For example, the multiplex unit G, when receiving a high-speed signal, with its "K1Tr#i" and "K2Tr#i" or its TTAIS byte being a certain code value, e.g., "FF" in hexadecimal, indicative of the alarm, it inserts for each frame a value excluding "F6" and "28" in hexadecimal that are the framing patterns, e.g., "FF", to the framing bytes, i.e., A1 byte and A2 byte, of transport overhead of the low-speed signal, and sends the resulting bytes to the low-speed OC-12 path. Consequently, the unit D on the low-speed side detects the loss of frame (LOF). Since the LOF is a cause of switching based on the BLSR switching schemes of linear 1+1 and linear 1:N, it is possible to induce the protection switching operation of the low-speed path.

For another example, the multiplex unit G, when receiving a high-speed signal, with its "K1Tr#i" and "K2Tr#i" or its TTAIS byte being a certain code value, e.g., "FF" in hexadecimal, indicative of the alarm, it halts the transmission of the corresponding low-speed signal. Consequently, the unit D on the low-speed side detects the loss of signal (LOS). Since the LOS is a cause of switching based on the BLSR switching schemes of linear 1+1 and linear 1:N, it is possible to induce the protection switching operation of the low-speed path.

The foregoing embodiments use the undefined area of the line overhead of the OC-N frame for the transport of alarm through the high-speed OC-N path section. The insertion or detection of the alarm code at these byte positions is carried out obviously in the location for the so-called line termination function or multiplex section termination function stated in the SONET and SDH standards. For example, in case the alarm code is inserted into the Trb.K1" or "Trb.K2" of one frame, these bytes are included in the operation area of the B2 byte to be inserted into the next frame.

Next, the multiplex equipment used in this invention, which is of the line terminating equipment (LTE) type or the add/drop multiplex (ADM) type for example, will be explained.

Figure 15:
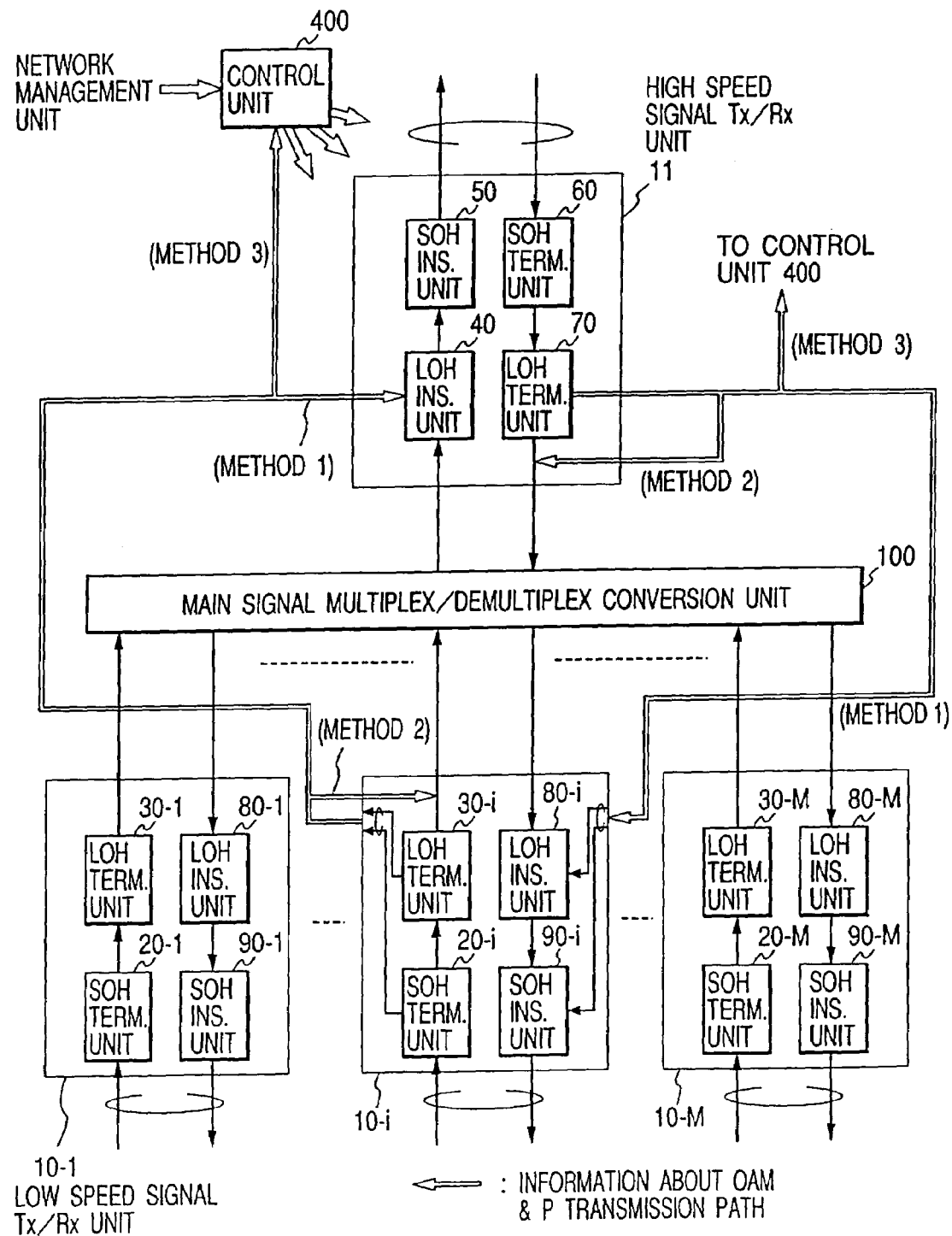
FIG. 15 is a block diagram of an LTE-type multiplex transmission equipment.

FIG. 15 shows the arrangement of an LTE-type multiplex equipment. The LTE-type multiplex equipment has functions of multiplexing low-speed signals (OC-M) into a high-speed signal (OC-N) and demultiplexing a high-speed signal (OC-N) into low-speed signals (OC-M). More specifically, it introduces low-speed multiplex signals consisting of multiple transport overheads and multiplex main signals and a high-speed multiplex signal consisting of a transport overhead and multiplex main signal to implement the processes of termination and replacement of transport overheads of these multiplex signals, and carries out the multiplexing and demultiplexing between the low-speed multiplex main signals and the high-speed multiplex main signal.

For example, the multiplex equipment introduces 16 low-speed multiplex signals of OC-12, and implements for their main signals the multiplexing/demultiplexing process and overhead process in connection with a high-speed multiplex signal of OC-192 in accordance with the SONET standard. It also transports through for other multiplex equipment the transport overheads of the input multiplex signals.

The multiplex equipment, which performs these signal multiplexing/demultiplexing and overhead process, includes low-speed signal sending/receiving units 10-1 through 10-M which receive and release M sets of low-speed multiplex signals and implement the processes of their transport overheads and main signals, a high-speed signal sending/receiving unit 11 which receives and releases a high-speed multiplex signal and implements the processes of its transport overhead and main signal, a main signal multiplexing/demultiplexing unit 100 which implements the multiplexing and demultiplexing between the low-speed main signals and high-speed main signal, and a control unit 400 which controls the whole equipment.

The low-speed signal sending/receiving units 10-1 through 10-M include section overhead (SOH) terminating units 20-1 through 20-M which receive low-speed signals and implement the termination process for the received section overheads, line overhead (LOH) terminating units 30-1 through 30-M which implement the termination process for the received line overheads, LOH inserting units 80-1 through 80-M which put the sending line overhead bytes to the outgoing signals, and SOH inserting units 90-1 through 90-M which put the sending section overhead bytes to the outgoing signals. Similarly, the high-speed signal sending/receiving unit 11 includes a SOH terminating unit 60, a LOH terminating unit 70, a LOH inserting unit 40, and a SOH inserting unit 50 for the high-speed signals.

Through-transport of OAM&P information signifies that the OAM&P information in the low-speed signals received by low-speed units 10-i ($1 \leq i \leq M$) is sent by through-transport through the high-speed path by being inserted into the undefined area of the transport overhead in the high-speed signal to be sent out of the high-speed unit 11, and the content of the undefined area of the transport overhead in the high-speed signal received by the high-speed unit 11 is sent out to the low-speed paths by being inserted intact into the defined areas of transport overheads of the low-speed signals to be sent out of the low-speed units 10-i.

There are three conceivable methods of the transport of OAM&P information through the equipment, as follows.

Method 1: Information from the low-speed paths is separated from the main signals by the low-speed units 10-i, conducted through the special signal paths which bypass the main signal multiplexing/demultiplexing unit 100 to the high-speed unit 11, and inserted into the main signal. Information from the high-speed path is separated from the main signal by the high-speed unit 11, conducted through the special signal path which bypasses the main signal multiplexing/demultiplexing unit 100 to the low-speed units 10-i, and inserted into the main signals.

Method 2: Information from the low-speed paths is inserted into the time slot positions corresponding to the undefined areas of the main signal overheads by the low-speed units 10-i, conducted through in the main signal multiplexing/demultiplexing unit 100, and sent by through-transport by the high-speed unit 11. Information from the high-speed path is conducted through time slot positions corresponding to the undefined areas of the main signal overhead by the high-speed unit 11, conducted through in the main signal multiplexing/demultiplexing unit 100, and inserted into certain signal position by the low-speed units 10-i.

Method 3: Information extracted by the low-speed units 10-i from information coming in from the low-speed paths is written to a memory or registers temporarily, the contents of the memory or registers are read out and loaded into a memory or registers of the high-speed unit 11 under the CPU-based firmware control, the contents set in the memory or registers are read out and inserted into the undefined area of the main signal overhead by the high-speed unit 11. Information extracted by the high-speed unit 11 from information coming in from the high-speed path is written to a memory or registers temporarily, the contents of the memory or registers are read out and loaded into memories or registers of the low-speed units 10-i under the CPU-based firmware control, the contents set in the memories or registers are read out and inserted into the undefined area of the main signal overheads by the low-speed units 10-i.

Based on the foregoing arrangement, the multiplex equipment introduces the low-speed and high-speed multiplex signals, implements the multiplexing and demultiplexing of the main signals, and feeds through or terminates the overheads that are predetermined for the network which uses the equipment.

Figure 16:
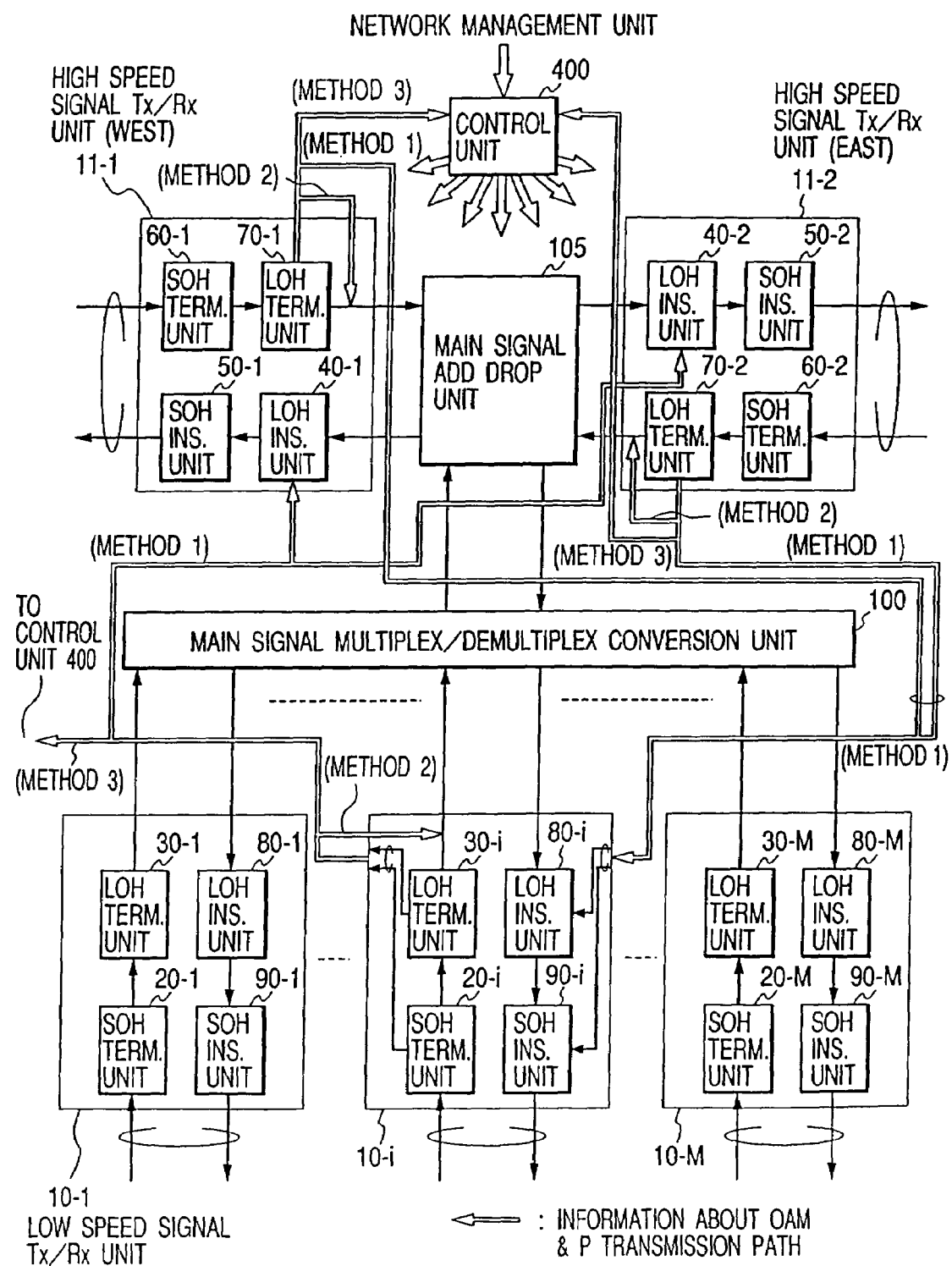
FIG. 16 is a block diagram of an ADM-type multiplex transmission equipment.

FIG. 16 shows the arrangement of an ADM-type multiplex equipment. The ADM-type multiplex equipment, which is connected with high-speed paths (OC-N) on its both sides and with multiple low-speed paths (OC-M) (M is smaller than or equal to N), has functions of multiplexing low-speed signals (OC-M) into a high-speed signal (OC-N) and demultiplexing a high-speed signal (OC-N) into low-speed signals (OC-M), and further has functions of replacing the time slots of STS paths between the high-speed signals (OC-N) and conducting through the time slots. More specifically, it introduces low-speed multiplex signals consisting of multiple transport overheads and multiplex main signals and two high-speed multiplex signals consisting of two transport overheads and multiplex main signals to implement the processes of termination and replacement of transport overheads of these multiplex signals, and carries out the addition of the low-speed multiplex main signals to a high-speed multiplex main signal, the dropping of the low-speed multiplex main signals from a high-speed multiplex main signal, and the cross-connection and through-transport of the high-speed multiplex main signals.

For example, it implements the above-mentioned main signal process and overhead process stated in the SONET standard for the low-speed multiplex signals of OC-12 and high-speed multiplex signals of OC-192, while sending by through-transport the transport overheads of the incoming multiplex signals for use in other equipment. The above-mentioned high-speed and low-speed signals can be signals of the same speed.

The ADM-type equipment is virtually identical in arrangement to the LTE-type equipment explained previously, with the same functional blocks being referred to by the common symbols in FIG. 15 and FIG. 16. It is converted from the LTE-type equipment in terms of the disposition and the number of the functional blocks, and provided additionally with a main signal adding/dropping unit 105 which implements the addition, dropping, cross-connection and through-transport of the main signals. The following explains only portions different from the LTE-type equipment.

The ADM-type equipment has two high-speed signal sending/receiving units, i.e., West-side unit 11-1 and East-side unit 11-2, which are used to connect ADM-type equipment on its both sides on the high-speed path. In order to carry out the above-mentioned main signal processing based on the connection of the high-speed units 11-1 and 11-2 and low-speed units 10-2 through 10-M or the connection between the high-speed units 11-1 and 11-2, the additional main signal adding/dropping unit 105 is disposed between the high-speed units 11-1 and 11-2 and the main signal multiplexing/demultiplexing unit 100.

The equipment is designed to transport through the transport overheads of high-speed multiplex signals based on any of the Schemes 1, 2 and 3 explained previously in connection with the LTE-type equipment.

The transmission network arranged with these multiplex equipment operates to transport the alarm for inducing the protection switching to the low-speed network at the occurrence of a fault on the low-speed path which is immediately preceding the multiplexing to the high-speed network or at the occurrence of a fault on a high-speed path section, whereby a multiplex transmission apparatus and multiplex transmission network which are independent of the alteration of network configuration and have the superior OAM&P functions, particularly the protection switching operation, can readily be accomplished.

According to the present invention, it becomes possible to realize a method and apparatus for multiplex transmission which implement the protection switching of transmission paths reliably.

What is claimed is:

1. A multiplex transmission apparatus connected to a plurality of first communication lines each transmitting a signal comprising of an overhead and a payload according to the standard of SONET (Synchronous Optical Network) or SDH (Synchronous Digital Hierarchy) and to at least one second communication line capable of transmitting a signal according to the same standard as said first communication lines at a speed higher than that of each of said first communication lines, the multiplex transmission apparatus comprising:

a plurality of first transceiver units each connected to one of said first communication lines for receiving a signal transferred on the first communication line and processing a first overhead extracted from the received signal;

a multiplexing and conversion unit for multiplexing at least payload portions of a plurality of signals received from said first transceiver units to generate a payload of a signal to be transmitted to said second communication line;

a second transceiver unit connected to said second communication line and said multiplexing and conversion unit for processing a second overhead to be transferred on the second communication line and transmitting a signal having the second overhead and the payload generated by said multiplexing and conversion unit to said second communication line; and a control unit for controlling the whole operation of the multiplex transmission apparatus, wherein said control unit instructs said second transceiver unit, when said first overhead received by one of said first transceiver units includes, at a predetermined location thereof, automatic protection switching (APS) bytes indicating that a failure occurs on one of said first communication lines, to add the alarm indication to said second overhead, said second transceiver unit inserts a bit pattern into a predetermined location of said second overhead in response to the instruction from said control unit and transmits a signal having the second overhead with said bit pattern to said second communication line, at least three low order bits of the bit pattern having an all "1" value, and said predetermined location being within a line overhead in the case of SONET and within an M section in the case of SDH, wherein said predetermined location of said second overhead where said bit pattern is inserted resides in an undefined area having no authorized definition with respect to information to be set therein according to said SONET and SDH standard.

2. The multiplex transmission apparatus according to claim 1, wherein each of said first communication lines and said second communication line further comprises a pair of a working line and a protection line, where said APS bytes give a trigger for switching from the working line to the protection line.

3. A multiplex transmission apparatus connected to at least one first communication line transmitting a signal comprising of an overhead and a payload according to SONET (Synchronous Optical Network) or SDH (Synchronous Digital Hierarchy) and to a plurality of second communication lines each transmitting a signal according to the same standard as said first communication line at a speed lower than that of the first communication line, the multiplex transmission apparatus comprising:

a first transceiver unit connected to said first communication line for receiving a signal transferred on said first communication line and processing a first overhead extracted from the received signal;

a demultiplexing and conversion unit for demultiplexing at least payload portion of the signal received by said first transceiver unit to generate a plurality of payloads of signals to be transmitted to said second communication lines;

a plurality of second transceiver units each connected to said demultiplexing and conversion unit and to one of said second communication lines for processing a second overhead to be transferred on the second communication line and transmitting the second overhead and at least a part of said plurality of payloads generated by said demultiplexing and conversion unit to the second communication lines; and a control unit for controlling the whole operation of the multiplex transmission apparatus, wherein said control unit instructs said, second transceiver units, when said first overhead received by said first transceiver unit includes a bit pattern at a predetermined location within a line overhead in the case of SONET and within an M section in the case of SDH, to add the bit pattern to each of said second overheads to be transmitted to said second transmission lines, at least three low order bits of said bit pattern having an all "1" value, and each of said second transceiver unit adds said bit pattern to a predetermined location of the second overhead in response to the instruction from said control unit and transmits a signal having the second overhead with said bit pattern to one of said second communication lines, and wherein said predetermined location of said first overhead where said bit pattern is included resides in an undefined area having no authorized definition with respect to information to be set therein according to said SONET and SDH standards.

4. The multiplex transmission apparatus according to claim 3, wherein each of said first communication line and said second communication lines further comprise a pair of a working line and a protection line, and said bit pattern gives a trigger for switching from the working line to the protection line.

* * * * *